(12) United States Patent
Bennett (10) Patent No.: US 7,330,019 B1
(45) Date of Patent: Feb. 12, 2008

(54) ADJUSTING ON-TIME FOR A DISCONTINUOUS SWITCHING VOLTAGE REGULATOR

(75) Inventor: George J. Bennett, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/590,704

(22) Filed: Oct. 31, 2006

(51) Int. Cl.
G05F 1/575 (2006.01)
G05F 1/56 (2006.01)

(52) U.S. Cl. ..................................... 323/282
(58) Field of Classification Search ............... 323/223, 323/282, 284, 285, 351
See application file for complete search history.

(56) References Cited

U.S. PATENT DOCUMENTS

| | | | |
|---|---|---|---|
| 4,675,617 A | 6/1987 | Martin | |
| 4,737,670 A | 4/1988 | Chan | |
| 4,822,144 A | 4/1989 | Vriens | |
| 4,922,141 A | 5/1990 | Lofgren et al. | |
| 5,146,121 A | 9/1992 | Searles et al. | |
| 5,440,250 A | 8/1995 | Albert | |
| 5,440,520 A | 8/1995 | Schutz et al. | |
| 5,479,119 A | 12/1995 | Tice et al. | |
| 5,612,610 A | 3/1997 | Borghi et al. | |
| 5,629,610 A * | 5/1997 | Pedrazzini et al. | 323/283 |
| 5,638,019 A | 6/1997 | Frankeny | |
| 5,661,422 A | 8/1997 | Tice et al. | |
| 5,747,976 A * | 5/1998 | Wong et al. | 323/282 |
| 5,748,050 A | 5/1998 | Anderson | |
| 5,777,567 A | 7/1998 | Murata et al. | |
| 5,787,292 A | 7/1998 | Ottesen et al. | |
| 5,808,455 A * | 9/1998 | Schwartz et al. | 323/271 |
| 5,994,885 A | 11/1999 | Wilcox et al. | |
| 6,055,287 A | 4/2000 | McEwan | |
| 6,125,157 A | 9/2000 | Donnelly et al. | |
| 6,157,247 A | 12/2000 | Abdesselem et al. | |
| 6,259,293 B1 | 7/2001 | Hayase et al. | |
| 6,285,263 B1 | 9/2001 | Anderson | |
| 6,333,652 B1 | 12/2001 | Iida et al. | |

(Continued)

OTHER PUBLICATIONS

T.D. Burd, et al., "A Dynamic Voltage Scaled Microprocessor System," IEEE Journal of Solid-State Circuits, vol. 35, No. 11, pp. 1571-1580, Nov. 2000.

(Continued)

Primary Examiner—Gary L Laxton
(74) Attorney, Agent, or Firm—Howard H. Sheerin, Esq.

(57) ABSTRACT

A discontinuous switching voltage regulator is disclosed including a charging element operable to generate an output voltage, switching circuitry coupled to the charging element, and switch control circuitry to configure the charging element during a cycle, including to charge the charging element for an on-time, discharge the charging element for a discharge time, and tristate the charging element for a tristate time. In operation, the on-time is initialized to a first on-time, and a first switch time is measured comprising the first on-time and a first discharge time of a first cycle. A first tristate time of the first cycle is measured, and a first ratio of the first tristate time to the first switch time is determined. The first ratio is compared to a first ratio threshold, and the on-time is adjusted to a second on-time if the first ratio exceeds the first ratio threshold.

32 Claims, 6 Drawing Sheets

U.S. PATENT DOCUMENTS

| | | | |
|---|---|---|---|
| 6,356,062 | B1 | 3/2002 | Elmhurst et al. |
| 6,424,184 | B1 | 7/2002 | Yamamoto et al. |
| 6,425,086 | B1 | 7/2002 | Clark et al. |
| 6,449,575 | B2 | 9/2002 | Bausch et al. |
| 6,515,460 | B1 | 2/2003 | Farrenkopf |
| 6,525,585 | B1 | 2/2003 | Iida et al. |
| 6,535,735 | B2 | 3/2003 | Underbrink et al. |
| 6,577,535 | B2 | 6/2003 | Pasternak |
| 6,617,936 | B2 | 9/2003 | Dally et al. |
| 6,622,252 | B1 | 9/2003 | Klaasen et al. |
| 6,657,467 | B2 | 12/2003 | Seki et al. |
| 6,693,473 | B2 | 2/2004 | Alexander et al. |
| 6,831,494 | B1 | 12/2004 | Fu et al. |
| 6,868,503 | B1 | 3/2005 | Maksimovic et al. |
| 6,870,410 | B1 | 3/2005 | Doyle et al. |
| 6,885,210 | B1 | 4/2005 | Suzuki |
| 6,909,266 | B2 | 6/2005 | Kernahan et al. |
| 6,987,380 | B1 | 1/2006 | Lee |
| 7,015,735 | B2 | 3/2006 | Kimura et al. |
| 7,042,202 | B2 | 5/2006 | Sutardja et al. |
| 7,061,292 | B2 | 6/2006 | Maksimovic et al. |
| 7,109,695 | B2 | 9/2006 | King |
| 7,129,763 | B1 | 10/2006 | Bennett et al. |
| 7,205,805 | B1 | 4/2007 | Bennett |
| 2003/0093160 | A1 | 5/2003 | Maksimovic et al. |
| 2004/0257056 | A1 | 12/2004 | Huang et al. |
| 2005/0134391 | A1 | 6/2005 | Kimura et al. |
| 2005/0140418 | A1 | 6/2005 | Muniandy et al. |
| 2005/0218871 | A1 | 10/2005 | Kang et al. |
| 2005/0218877 | A1 | 10/2005 | Oswald et al. |

OTHER PUBLICATIONS

Gu-Yeon Wei, et al., "A Fully Digital, Energy-Efficient, Adaptive Power-Supply Regulator," IEEE Journal of Solid-State Circuits, vol. 34, No. 4, pp. 520-528, Apr. 1999.

Anthony John Stratakos, "High-Efficiency Low-Voltage DC-DC Conversion for Portable Applications," pp. 1, 124-129, 177-183, 188-191, Ph.D. Dissertation, University of California, Berkley, Dec. 1998.

Aleksandar Prodic, et al., "Mixed-Signal Simulation of Digitally Controlled Switching Converters," IEEE Compel, pp. 100-105, Jun. 2002.

Jinwen Xiao, et al., "A 4-µA Quiescent-Current Dual-Mode Digitally Controlled Buck Converter IC for Cellular Phone Applications," IEEE Journal of Solid-State Circuits, vol. 39, No. 12, pp. 2342-2348, Dec. 2004.

Shamim Choudhury, "Designing a TMS320F280x Based Digitally Controlled DC-DC Switching Power Supply," Texas Instruments Application Report, http://focus.ti.com, spraab3.pdf, pp. 1-16, Jul. 2005.

Marc Fleischmann, "LongRun Power Management, Dynamic Power Management for Crusoe Processors," Transmeta Corporation, pp. 1-18, Jan. 17, 2001.

Alexander Klaiber, "The Technology Behind Crusoe Processors, Low-Power x86-Compatible Processors Implemented with Code Morphing Software," Transmeta Corporation, pp. 1-18, Jan. 2000.

"Applications for White LED Driver in Parallel vs. Series," Analog Integrations Corporation (AIC), AIC1845, AN027.pdf, www.analog.com, pp. 1-7, Oct. 2003.

"Power Supply Regulation," printout from Altera website, http://www.altera.com/support/devices/power/regulators/pow-regulators.html, Oct. 2006.

* cited by examiner

FIG. 3B

ADJUSTING ON-TIME FOR A DISCONTINUOUS SWITCHING VOLTAGE REGULATOR

CROSS REFERENCE TO RELATED PATENTS AND PATENT APPLICATIONS

This application is related to U.S. patent application Ser. No. 11/393,425 filed on Mar. 30, 2006, entitled "SWITCHING VOLTAGE REGULATOR COMPRISING A CYCLE COMPARATOR FOR DYNAMIC VOLTAGE SCALING" the disclosure of which is incorporated herein by reference.

BACKGROUND OF THE INVENTION

1. Field of the Invention

The present invention relates to voltage regulators. More particularly, the present invention relates to adjusting the on-time for a discontinuous switching voltage regulator.

2. Description of the Prior Art

Discontinuous switching voltage regulators comprise a charging element that is charged/discharged and then tristated over a cycle that begins when an error signal exceeds a threshold. For example, the charging time may begin when an output voltage falls below a reference voltage, or when a propagation oscillation signal representing a propagation delay of a digital circuit falls below a reference oscillation signal. In a discontinuous buck mode switching voltage regulator, the charging element typically comprises an inductor that is connected to a source voltage through an upper switch (e.g., a field effect transistor or FET) while charging during an "on-time," and connected to ground through a lower switch (e.g., using a diode or FET) while discharging during a "discharge time." Once the inductor discharges, both the upper and lower switches are opened to tristate the inductor during a "tristate time" in order to prevent an output capacitor from discharging through the inductor to ground. The inductor remains in tristate until the error signal exceeds the threshold which starts a new cycle.

The on-time of the discontinuous mode cycle may be established relative to the current flowing through the inductor such that the upper switch is turned off when the current exceeds a peak current threshold. The prior art has suggested to adjust the peak current threshold according to a linear transfer function of the estimated load current to improve power efficiency and reduce ripple voltage. However, employing a linear transfer function to adjust the peak current threshold may decrease power efficiency due to an increase in the transient response time, and it may also lead to instability. In addition, employing an analog current sensor and a programmable analog current comparator can increase the cost and complexity of the switching voltage regulator.

There is, therefore, a need to adjust the on-time of a discontinuous switching voltage regulator to improve power efficiency while maintaining an acceptable transient response. There is also a need to avoid the cost and complexity of a current controlled loop using an analog current sensor and a programmable analog current comparator.

SUMMARY OF THE INVENTION

An embodiment of the present invention comprises a discontinuous switching voltage regulator including a charging element operable to generate an output voltage, switching circuitry coupled to the charging element, and switch control circuitry operable to control the switching circuitry to configure the charging element during a cycle, including to charge the charging element for an on-time, discharge the charging element for a discharge time, and tristate the charging element for a tristate time. In operation, the on-time is initialized to a first on-time, and a first switch time is measured comprising the first on-time and a first discharge time of a first cycle. A first tristate time of the first cycle is measured, and a first ratio of the first tristate time to the first switch time is determined. The first ratio is compared to a first ratio threshold, and the on-time is adjusted to a second on-time if the first ratio exceeds the first ratio threshold.

In one embodiment, the first cycle is started in response to an error signal. In one embodiment, the error signal comprises a difference between the output voltage and a reference voltage. In another embodiment, the error signal comprises a difference between a propagation oscillation signal and a reference oscillation signal, wherein the propagation oscillation signal represents a propagation delay of a digital circuit. In yet another embodiment, when the error signal crosses an error threshold, the switching circuitry is configured to charge the charging element for the on-time.

In one embodiment, the charging element comprises an inductor.

In another embodiment, after the on time, the switching circuitry is configured to discharge the charging element for the discharge time, and in one embodiment, after the discharge time, the switching circuitry is configured to tristate the charging element for the tristate time.

In yet another embodiment, if the first ratio is greater than the first ratio threshold, the second on-time is less than the first on-time, and in one embodiment, if the first ratio is less than the first ratio threshold, the second on-time is greater than the first on-time.

In still another embodiment, the switch control circuitry is further operable to measure a second switch time comprising the second on-time and a second discharge time of a second cycle, measure a second tristate time of the second cycle, determine a second ratio of the second tristate time to the second switch time, compare the second ratio to a second ratio threshold, and decrease the on-time to a third on-time if the second ratio is greater than the second ratio threshold. In one embodiment, the second on-time is approximately 1/N times the first on-time, and the third on-time is approximately 1/N times the second on-time.

In another embodiment, the switch control circuitry is further operable to measure a third switch time comprising the third on-time and a third discharge time of a third cycle, measure a third tristate time of the third cycle, determine a third ratio of the third tristate time to the third switch time, compare the third ratio to a third ratio threshold, and reset the on-time to the first on-time if the third ratio is less than the third ratio threshold.

In one embodiment, the switch control circuitry comprises a digital timer for timing the on-time; in another embodiment, the switch control circuitry comprises a digital timer for timing the discharge time, and in yet another embodiment, the switch control circuitry comprises a digital timer for timing the tristate time.

Another embodiment of the present invention comprises a method of operating a discontinuous switching voltage regulator. The discontinuous switching voltage regulator comprises a charging element operable to generate an output voltage, and switching circuitry coupled to the charging element, wherein the switching circuitry is configured during a cycle, including to charge the charging element for an on-time, discharge the charging element for a discharge time, and tristate the charging element for a tristate time. The on-time is initialized to a first on-time, and a first switch time is measured comprising the first on-time and a first discharge time of a first cycle. A first tristate time of the first cycle is measured, and a first ratio of the first tristate time to the first switch time is determined. The first ratio is compared to a first ratio threshold, and the on-time is adjusted to a second on-time if the first ratio exceeds the first ratio threshold.

DESCRIPTION OF THE PREFERRED EMBODIMENTS

Figure 1A:
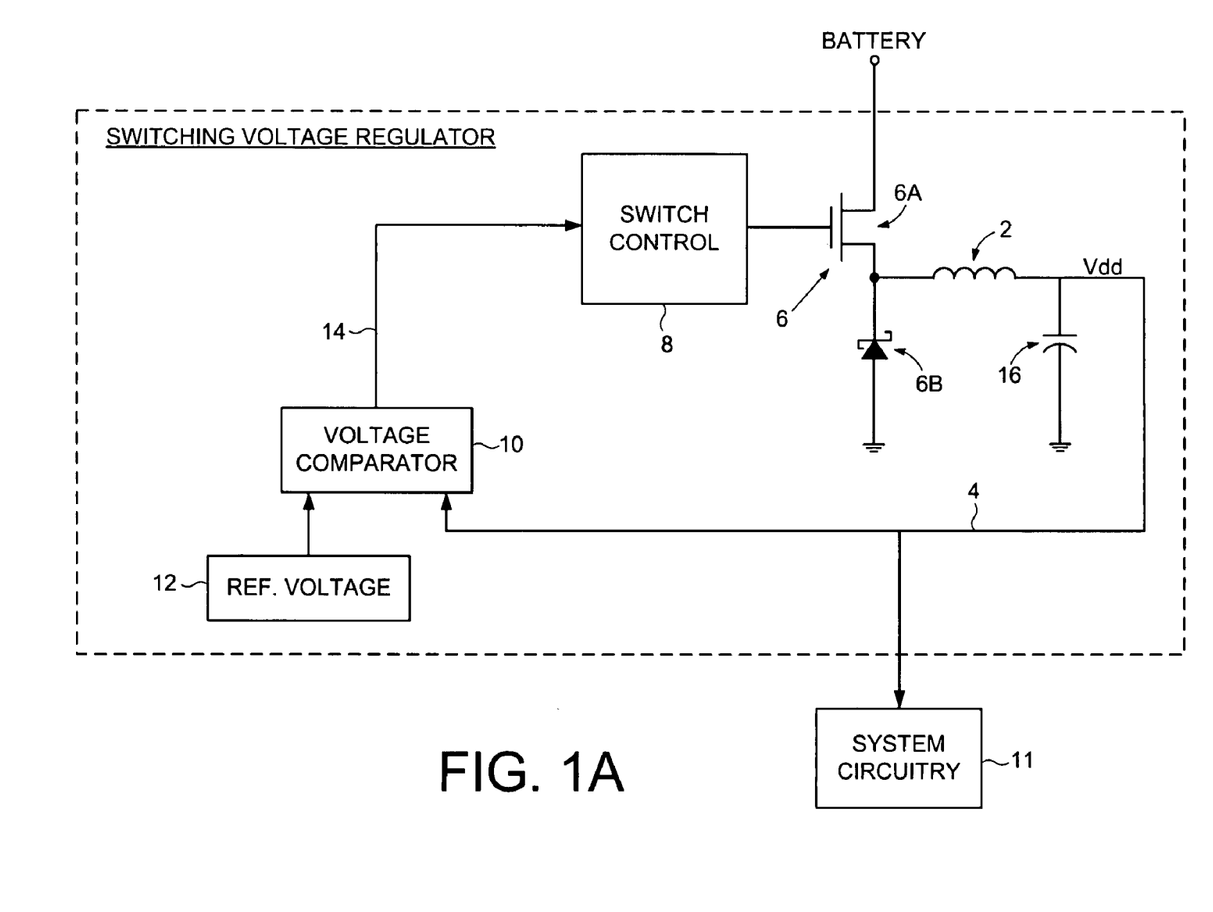
FIG. 1A shows a discontinuous switching voltage regulator according to an embodiment of the present invention comprising an inductor, switching circuitry, and switch control circuitry for controlling the switching circuitry in response to an error signal representing a difference between the output voltage and a reference voltage.

FIG. 1A shows an embodiment of the present invention comprising a discontinuous switching voltage regulator including a charging element 2 operable to generate an output voltage 4, switching circuitry 6 coupled to the charging element 2, and switch control circuitry 8 operable to control the switching circuitry 6 to configure the charging element 2 during a cycle, including to charge the charging element 2 for an on-time, discharge the charging element 2 for a discharge time, and tristate the charging element 2 for a tristate time. In operation, the on-time is initialized to a first on-time, and a first switch time is measured comprising the first on-time and a first discharge time of a first cycle. A first tristate time of the first cycle is also measured, and a first ratio of the first tristate time to the first switch time is determined. The first ratio is compared to a first ratio threshold, and the on-time is adjusted to a second on-time if the first ratio exceeds the first ratio threshold.

In the embodiment of FIG. 1A, the charging element 2 comprises an inductor, which may be implemented as a discrete or integrated element; however, any suitable charging element may be employed. The output voltage 4 is applied to system circuitry 11 and to a voltage comparator 10, which compares the output voltage 4 to a reference voltage 12. The reference voltage 12 is selected relative to the target output voltage 4, and it may be adjusted relative to the system circuitry's 11 mode of operation. For example, the reference voltage 12 may be reduced during modes of operation that require less power (e.g., slower data rate in a communication channel).

Figure 2A:
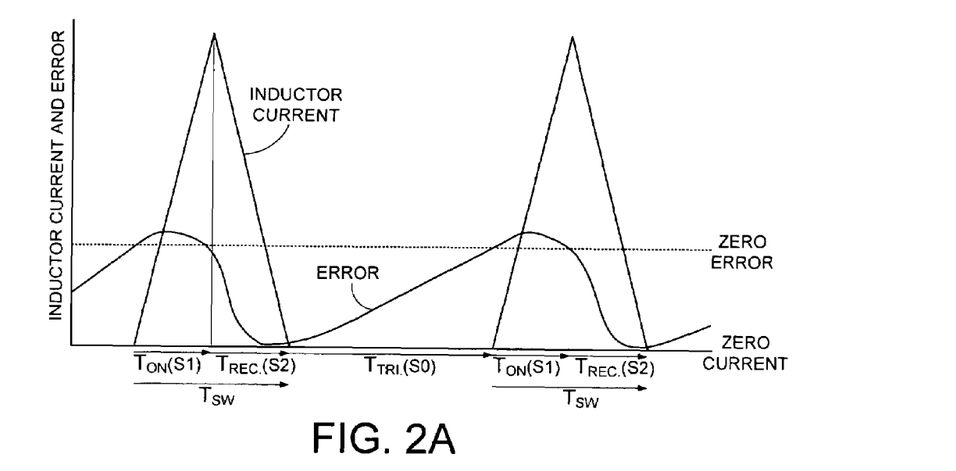
FIG. 2A illustrates an inductor current relative to an error signal as well as an on-time, discharge time, and tristate time of a cycle, according to one embodiment of the present invention.

As illustrated in FIG. 2A, when the output voltage 4 falls below the reference voltage 12, the resulting error signal 14 triggers the switch control circuitry 8 to begin a cycle by turning on a FET 6A to charge the charging element 2 for the on-time, thereby building a charge across a capacitor 16. After the on-time, the switch control circuitry 8 turns off the FET 6A so that the inductor current discharges while recirculating through a diode 6B to ground. When the inductor current falls to zero (or near zero) at the end of the recirculation time (i.e., discharge time), the diode 6B stops conducting, thereby preventing the output capacitor 16 from discharging through the inductor 2 to ground. The inductor 2 remains in this tristate condition during the tristate time until the output voltage 4 falls below the reference voltage 12 (and the error signal turns positive), as shown in FIG. 2A. In an alternative embodiment, the diode 6B is replaced with a FET and a current sensor, wherein the FET is turned off when the current sensor detects zero current flowing through the FET at the end of the discharge time.

Figure 1B:
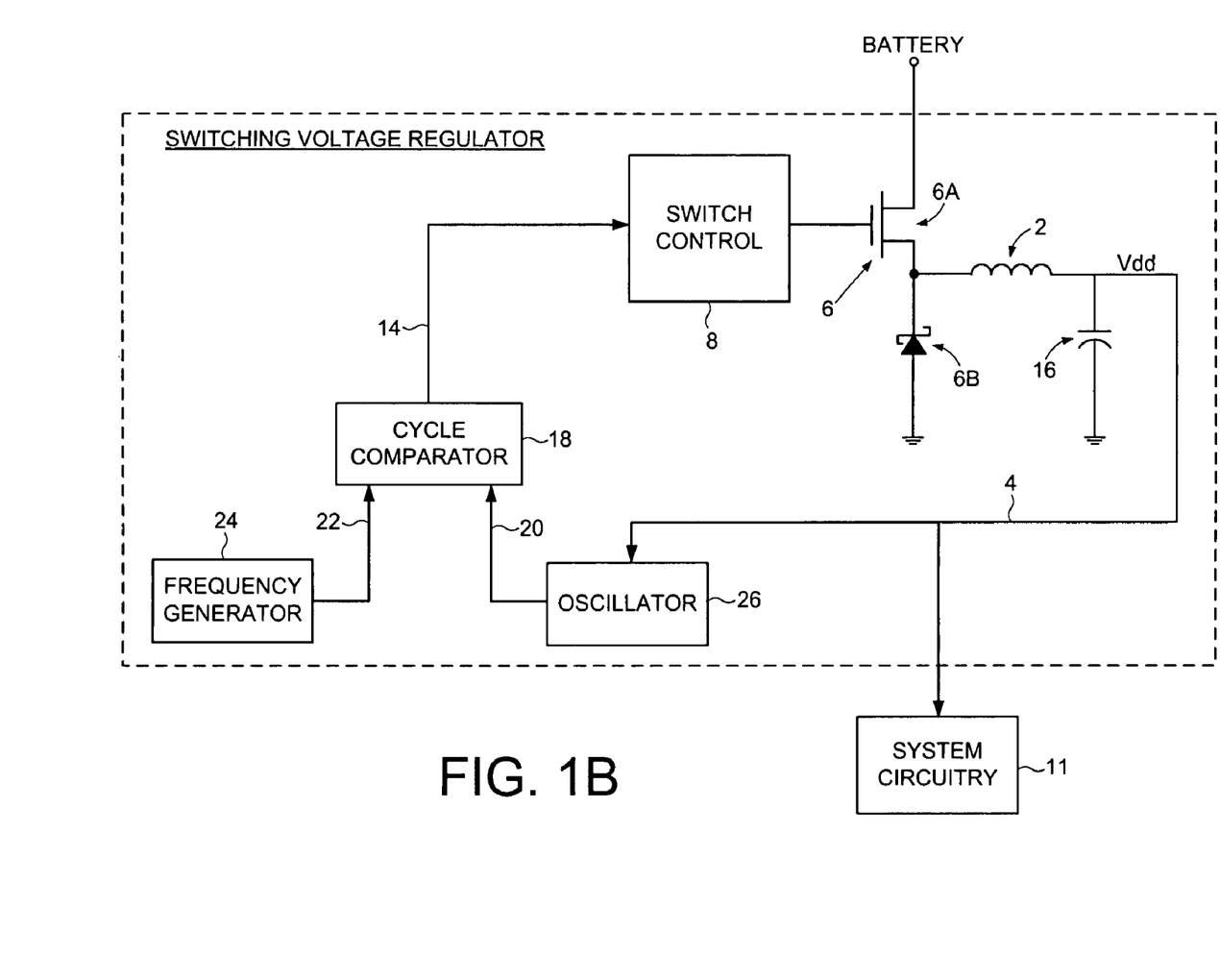
FIG. 1B shows a discontinuous switching voltage regulator according to an embodiment of the present invention comprising an inductor, switching circuitry, and switch control circuitry for controlling the switching circuitry in response to an error signal representing a difference between a propagation oscillation signal and a reference oscillation signal.

The error signal 14 may be generated in any suitable manner. FIG. 1B shows an embodiment of the present invention wherein the error signal 14 is generated by a cycle comparator 18 which compares a propagation oscillation signal 20 to a reference oscillation signal 22 output by a frequency generator 24. An oscillator 26 generates the propagation oscillation signal 20 which represents a propagation delay of a digital circuit within the system circuitry 11. Further details of this embodiment may be found in the above-identified co-pending patent application entitled "SWITCHING VOLTAGE REGULATOR COMPRISING A CYCLE COMPARATOR FOR DYNAMIC VOLTAGE SCALING." In yet other embodiments, the error signal 14 may represent a phase or frequency error between the propagation oscillation signal 20 and the reference oscillation signal 22 output by the frequency generator 24.

Figure 2B:
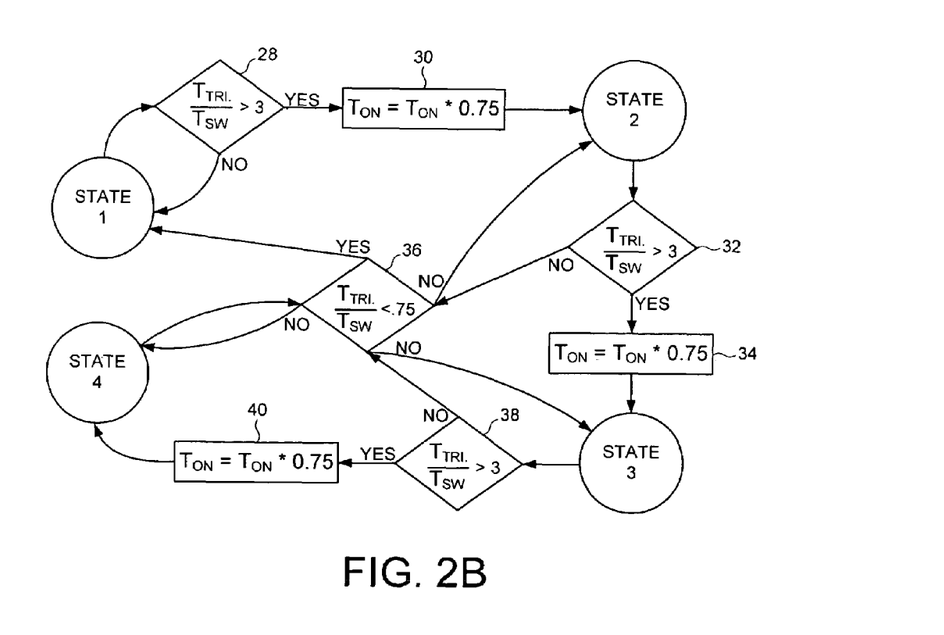
FIG. 2B is a state diagram illustrating an embodiment of the present invention wherein the on-time is reduced if the ratio of the tristate time to the switch time exceeds a predetermined threshold.

FIG. 2B is a state diagram illustrating how the on-time is adjusted according to an embodiment of the present invention. Operation of the discontinuous switching voltage regulator begins in STATE 1 where the on-time is initialized to a first on-time. In one embodiment, the first on-time is selected to maximize the peak inductor current while preventing damage to the FET 6A (e.g., an on-time that corresponds to the maximum peak current the FET 6A can handle minus a predetermined margin). During a first cycle, a first switch time ($T_{SW}$) is measured comprising the first on-time ($T_{ON}$) and a first discharge time ($T_{REC}$) of the inductor 2. A first tristate time of the first cycle is also measured, and a first ratio ($T_{TRI}/T_{SW}$) of the first tristate time to the first switch time is determined at branch 28. If the first ratio is greater than a first ratio threshold (e.g., 3) at branch 28, then at step 30 the on-time ($T_{ON}$) is adjusted to a second on-time by reducing the on-time by 25%, and the state changes to STATE 2. Otherwise, the on-time ($T_{ON}$) is not adjusted and the state remains in STATE 1. Any suitable value may be selected for the ratio threshold. For example, the first ratio threshold may be selected relative to the number of states in the state diagram, and/or relative to the range of on-times.

Referring again to FIG. 2B, assuming the state changes to STATE 2, during a second cycle a second switch time ($T_{SW}$) is measured comprising the second on-time ($T_{ON}$) and a second discharge time ($T_{REC}$) of the inductor 2. A second tristate time ($T_{TRI}$) of the second cycle is also measured, and a second ratio ($T_{TRI}/T_{SW}$) of the second tristate time to the second switch time is determined at branch 32. If the second ratio is greater than a second ratio threshold (e.g., 3) at branch 32, then at step 34 the on-time ($T_{ON}$) is adjusted to a third on-time by reducing the on-time by 25%, and the state changes to STATE 3. Thus, in one embodiment, the second on-time is approximately 1/N times the first on-time, the third on-time is approximately 1/N times the second on-time, and so on for the on-time of the following states. If the second ratio is not greater than the second ratio threshold at branch 32, then the second ratio is compared to a third ratio threshold (e.g., 0.75) at branch 36. If the second ratio is less than the third ratio threshold at branch 36, then the on-time is reset to the first on-time, and the state changes to STATE 1. Otherwise, the on-time ($T_{ON}$) is not adjusted, and the state remains in STATE 2. Assuming the state changes to STATE 3, a third switch time and a third tristate time are measured during a third cycle, a similar ratio generated and compared to a third ratio threshold at step 38, and the on-time adjusted accordingly at step 40.

The state diagram of FIG. 2B may comprise any suitable number of states, and may also be modified in any suitable manner. Adjusting the on-time relative to the ratio of the tristate time to the switch time may improve the transient response without requiring an analog current sensor or a programmable analog current comparator as in the prior art.

Figure 3A:
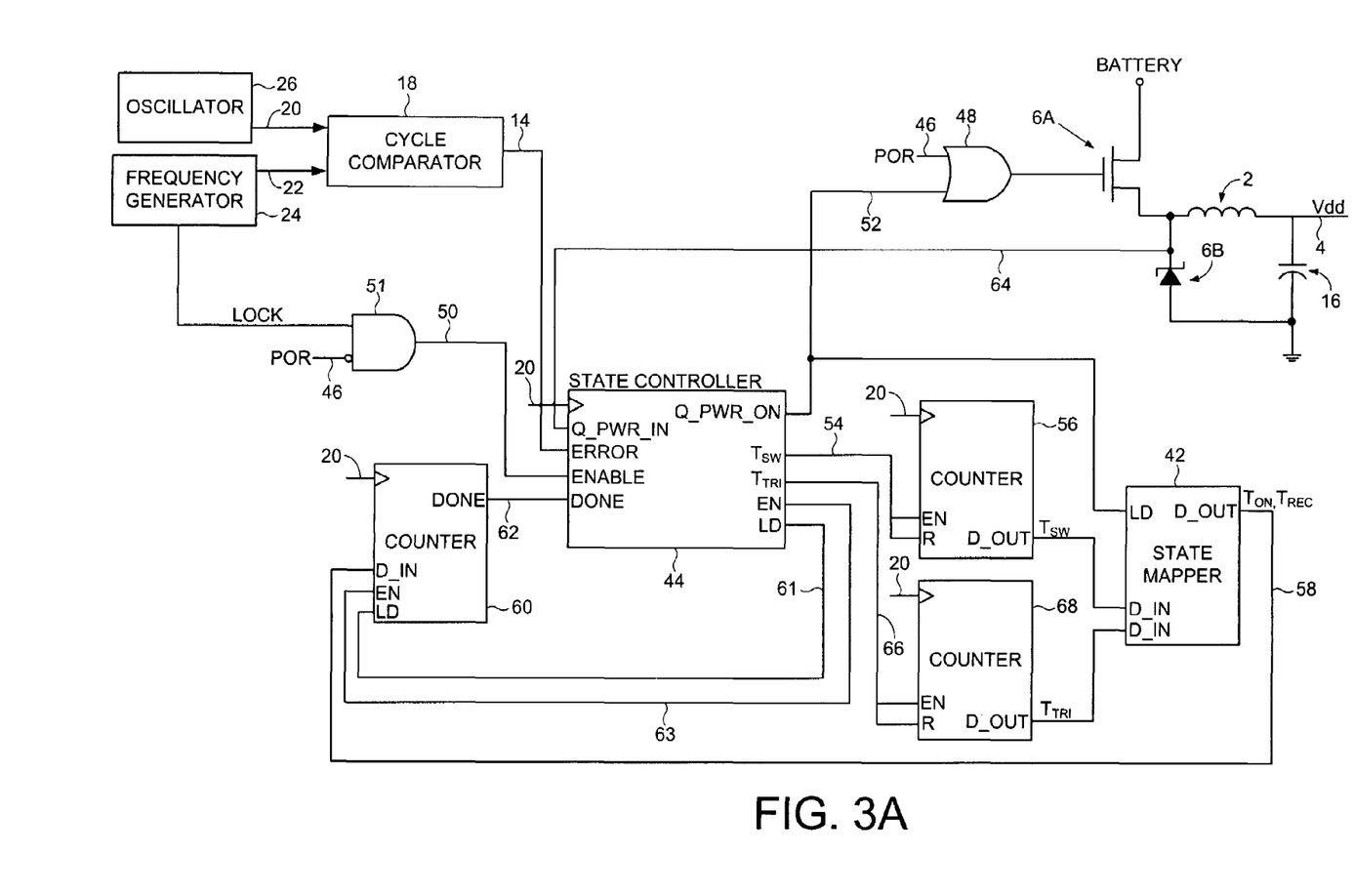
FIG. 3A shows example circuitry for implementing a discontinuous switching voltage regulator according to an embodiment of the present invention, including a state mapper for implementing the state diagram of FIG. 2B and state controller circuitry.

FIG. 3A shows circuitry for implementing a discontinuous switching voltage regulator according to an embodiment of the present invention, wherein the error signal 14 is generated by comparing a propagation oscillation signal 20 to a reference oscillation signal 22. However, the circuitry disclosed in FIG. 3A may also be employed in an embodiment wherein the error signal 14 is generated using a different method, for example, by comparing the output voltage 4 to a reference voltage 12 as shown in FIG. 1A. The circuitry in FIG. 3A comprises state mapper circuitry 42 for implementing the state diagram of FIG. 2B, and state controller circuitry 44 for generating three state signals S0, S1 and S2 corresponding to three states of the switching voltage regulator $T_{TRI}$, $T_{ON}$, and $T_{REC}$. The state mapper circuitry 42 may comprise any suitable circuitry for implementing the state diagram of FIG. 2B, such as a suitable state machine together with suitable math operators (multipliers, dividers, etc.) and/or code segments of a control program executed by a microprocessor.

At startup, a power-on-reset (POR) signal 46 is held high turning FET 6A on through OR gate 48 until the output voltage 4 rises sufficiently for the oscillator 26 to function properly. When POR 46 is reset, the FET 6A is turned off. When the frequency generator 24 is frequency locked, the state controller 44 is enabled via control signal 50 output by AND gate 51. At this point, the state controller 44 has been initialized to state S0 (tristate time of FIG. 2A).

When the error signal 14 is high (e.g., when the propagation oscillation signal 20 falls below the reference oscillation signal 22), the state controller 44 transitions from state S0 to state S1 (on-time of FIG. 2A), which turns on FET 6A via control signal 52 and enables via control signal 54 a digital timer (counter) 56 to begin timing the switch time ($T_{SW}$). The state controller 44 also loads the on-time 58 generated by the state mapper 42 into a counter 60 (via control line 61) and enables the counter 60 via control line 63. The counter 60 generates a DONE signal 62 at the end of the on-time. When the DONE signal 62 is activated, the state controller 44 transitions from state S1 to state S2, loads a maximum discharge time into counter 60, and begins monitoring the voltage 64 across the diode 6B to detect the end of the discharge time. In one embodiment, the maximum discharge time is related to the inductor drive voltage (input voltage of the battery minus the output voltage Vdd in FIG. 1), and the flyback voltage that discharges the inductor 2 (Vdd plus the voltage across the diode 6B). If the input voltage is much higher than the output voltage (plus the reverse bias voltage caused by the flyback diode), then the maximum off time is selected to be longer than the on-time.

When the counter 60 reaches a terminal count, or the voltage 64 across the diode 6B indicates the end of the discharge time, the state controller 44 transitions from state S2 to state S0 and enables via control signal 66 a digital timer (counter) 68 for timing the next tristate time ($T_{TRI}$), and stops the counter 56. At the end of the tristate time (e.g., as discussed above, when the error signal 14 goes high), the state controller 44 loads via control signal 52 the switch time ($T_{SW}$) and the tristate time ($T_{TRI}$) into the state mapper 42, which generates the next on-time according to the state diagram of FIG. 2B. In one embodiment, the state mapper 42 generates the next on-time in a manner that compensates for the delay in computing the next on-time.

Figure 3B:
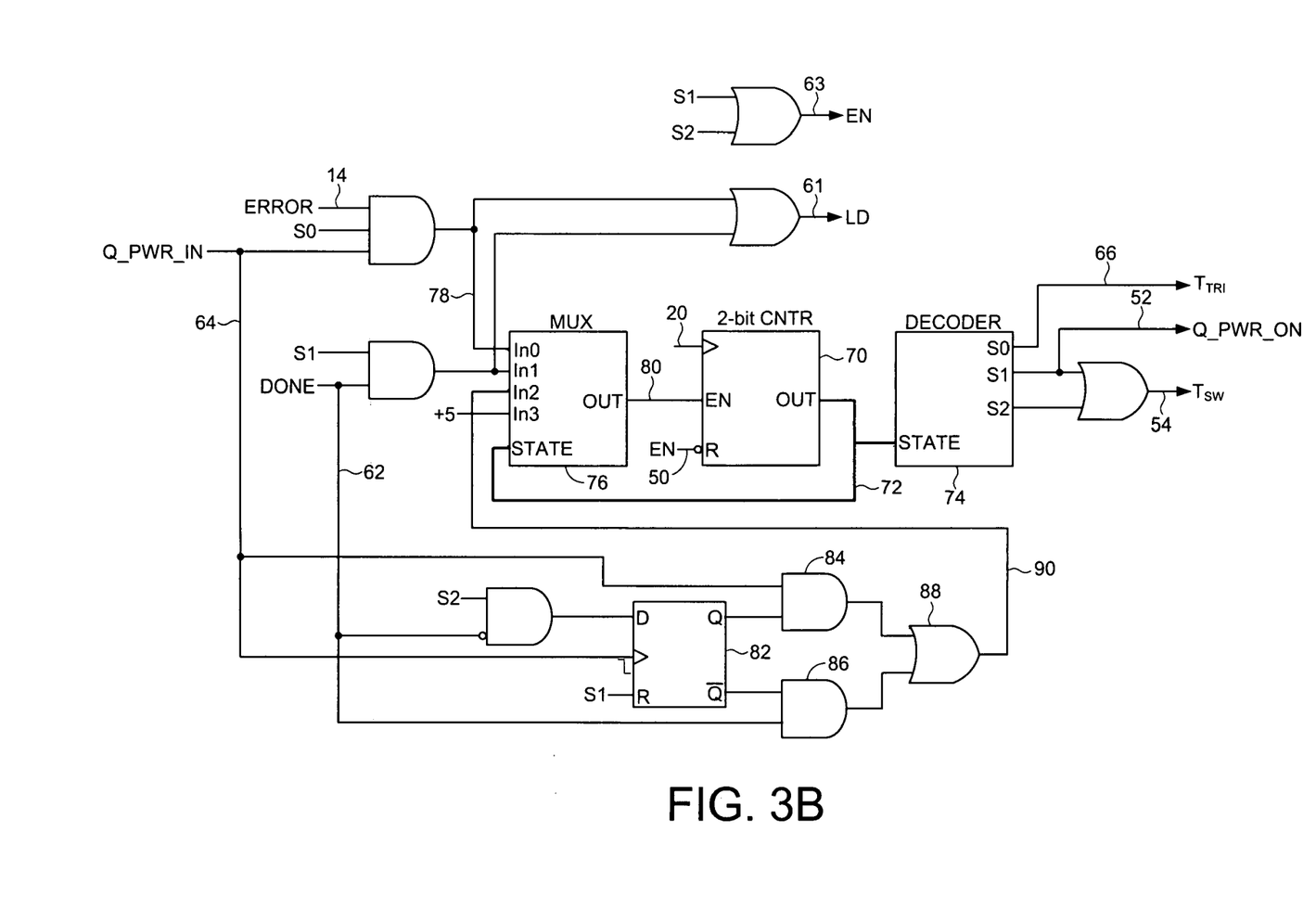
FIG. 3B shows example circuitry according to an embodiment of the present invention for implementing the state controller circuitry of FIG. 3A.

FIG. 3B shows circuitry for implementing the state controller 44 of FIG. 3A according to an embodiment of the present invention. A 2-bit counter 70 generates a 2-bit output 72 representing the three states (S0=00, S1=01, S2=10), and a decoder 74 activates one of three control signals in response to the output 72 of the 2-bit counter 70. The 2-bit counter 70 is initialized to state S0 by the enable signal 50 (see FIG. 3A). The 2-bit counter 70 is enabled by a multiplexer 76 when the switching voltage regulator transitions into the next state. For example, when in state S0, the multiplexer 76 outputs control signal 78 as the enable signal 80 to the 2-bit counter 70. When the error signal 14 is activated, control signal 78 enables the 2-bit counter 70 which transitions from state S0 to state S1. When the DONE signal 62 is activated indicating the end of the on-time, the multiplexer 76 enables the 2-bit counter 70 which transitions from state S1 to state S2. At the beginning of the discharge time (state S2), the voltage across the diode 6B transitions from a high to low logic level (over a certain interval) and then eventually rises from a low to high logic level at the end of the discharge time. A latch 82 is used to detect the low to high transition of voltage 64 at the end of the discharge time. When the voltage 64 transitions from high to low at the end of the on-time, the latch 82 enables an AND gate 84 which then detects the transition from low to high at the end of the discharge time. Alternatively, an AND gate 86 detects if the counter 60 (FIG. 3A) times out before the voltage 64 transitions from low to high. An OR gate 88 outputs the control signal 90 indicating the end of the discharge time, which enables the 2-bit counter 70 to transition from state S2 back to state S0 which activates control signal 66 to begin timing the tristate time.

Figure 4A:
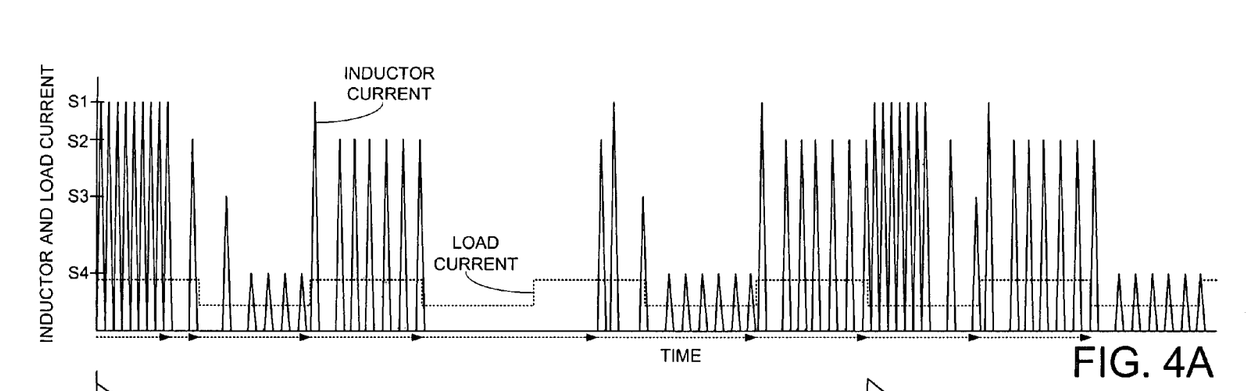
FIGS. 4A-4D illustrate operation of a discontinuous switching voltage regulator according to an embodiment of the present invention, including the inductor current, the load current, the error signal, the data rate of the system circuitry, and the output voltage.
Figure 4B:
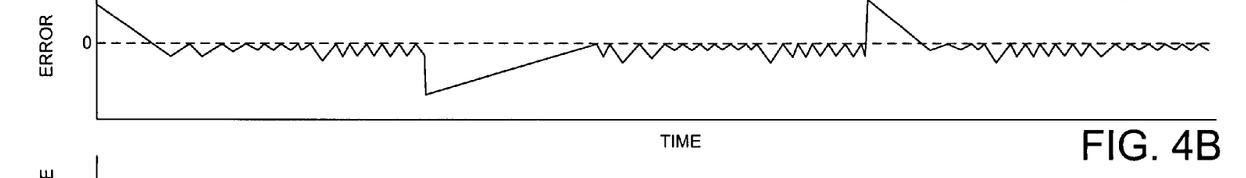
Figure 4C:
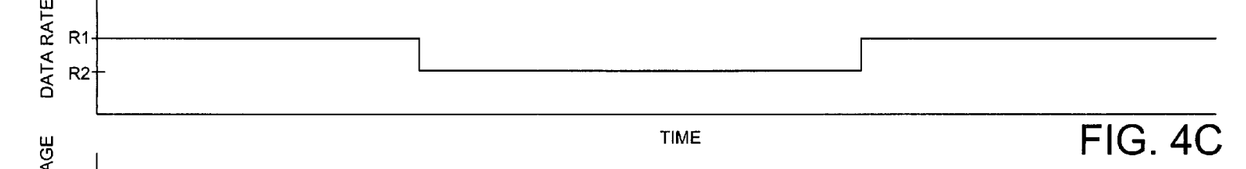
Figure 4D:
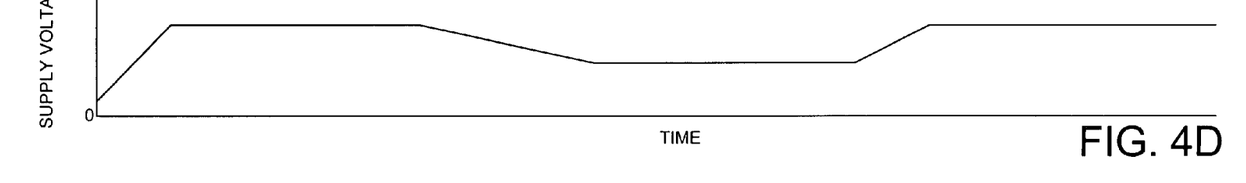

FIGS. 4A-4B illustrate operation of the switching voltage regulator, including the inductor current, load current, error signal, data rate, and output voltage. When initially powered on, the error signal is high and the state mapper 42 remains in STATE 1 (FIG. 2B) until the output voltage rises to an operating level. Once the output voltage stabilizes, the state mapper 42 reduces the on-time and transitions into STATE 2 and then into STATE 3. When the load current decreases (e.g., due to a change in operating mode), the state mapper 42 further reduces the on-time and transitions into STATE 4. When the load current again increases, the state mapper 42 resets the on-time to the maximum and transitions into STATE 1 as shown in FIG. 4A, and then transitions back into STATE 2 once the system stabilizes. When the data rate decreases as shown in FIG. 4C, the error signal remains negative for an extended period wherein the FET 6A remains off. Eventually the output voltage settles at a lower level corresponding to the lower data rate, and the state mapper 42 decreases the on-time until it settles into STATE 4. The state mapper 42 transitions back into STATE 1 when the load current increases and when the data rate increases as shown in FIGS. 4A and 4C. Adjusting the on-time relative to the ratio of the tristate time to the switch time may improve the transient response, such as when the data rate increases as illustrated in FIGS. 4C and 4D.

We claim:

1. A discontinuous switching voltage regulator comprising:
   (a) a charging element operable to generate an output voltage;
   (b) switching circuitry coupled to the charging element; and
   (c) switch control circuitry operable to control the switching circuitry to configure the charging element during a cycle, including to charge the charging element for an on-time, discharge the charging element for a discharge time, and tristate the charging element for a tristate time, and further operable to:
      initialize the on-time to a first on-time;
      measure a first switch time comprising the first on-time and a first discharge time of a first cycle;
      measure a first tristate time of the first cycle;
      determine a first ratio of the first tristate time to the first switch time;
      compare the first ratio to a first ratio threshold; and
      adjust the on-time to a second on-time if the first ratio exceeds the first ratio threshold.

2. The discontinuous switching voltage regulator as recited in claim 1, wherein the first cycle is started in response to an error signal.

3. The discontinuous switching voltage regulator as recited in claim 2, wherein the error signal comprises a difference between the output voltage and a reference voltage.

4. The discontinuous switching voltage regulator as recited in claim 2, wherein:
   the error signal comprises a difference between a propagation oscillation signal and a reference oscillation signal; and
   the propagation oscillation signal represents a propagation delay of a digital circuit.

5. The discontinuous switching voltage regulator as recited in claim 2, wherein when the error signal crosses an error threshold, the switching circuitry is configured to begin charging the charging element for the on-time.

6. The discontinuous switching voltage regulator as recited in claim 1, wherein the charging element comprises an inductor.

7. The discontinuous switching voltage regulator as recited in claim 1, wherein after the on time, the switching circuitry is configured to discharge the charging element for the discharge time.

8. The discontinuous switching voltage regulator as recited in claim 7, wherein after the discharge time, the switching circuitry is configured to tristate the charging element for the tristate time.

9. The discontinuous switching voltage regulator as recited in claim 1, wherein if the first ratio is greater than the first ratio threshold, the second on-time is less than the first on-time.

10. The discontinuous switching voltage regulator as recited in claim 1, wherein if the first ratio is less than the first ratio threshold, the second on-time is greater than the first on-time.

11. The discontinuous switching voltage regulator as recited in claim 1, wherein the switch control circuitry is further operable to:
    measure a second switch time comprising the second on-time and a second discharge time of a second cycle;
    measure a second tristate time of the second cycle;
    determine a second ratio of the second tristate time to the second switch time;
    compare the second ratio to a second ratio threshold; and
    decrease the on-time to a third on-time if the second ratio is greater than the second ratio threshold.

12. The discontinuous switching voltage regulator as recited in claim 11, wherein:
    the second on-time is approximately 1/N times the first on-time; and
    the third on-time is approximately 1/N times the second on-time.

13. The discontinuous switching voltage regulator as recited in claim 11, wherein the switch control circuitry is further operable to:
    measure a third switch time comprising the third on-time and a third discharge time of a third cycle;
    measure a third tristate time of the third cycle;
    determine a third ratio of the third tristate time to the third switch time;
    compare the third ratio to a third ratio threshold; and
    reset the on-time to the first on-time if the third ratio is less than the third ratio threshold.

14. The discontinuous switching voltage regulator as recited in claim 1, wherein the switch control circuitry comprises a digital timer for timing the on-time.

15. The discontinuous switching voltage regulator as recited in claim 1, wherein the switch control circuitry comprises a digital timer for timing the discharge time.

16. The discontinuous switching voltage regulator as recited in claim 1, wherein the switch control circuitry comprises a digital timer for timing the tristate time.

17. A method of operating a discontinuous switching voltage regulator, the discontinuous switching voltage regulator comprising a charging element operable to generate an output voltage, and switching circuitry coupled to the charging element, wherein the switching circuitry is configured during a cycle, including to charge the charging element for an on-time, discharge the charging element for a discharge time, and tristate the charging element for a tristate time, the method comprising:
    initializing the on-time to a first on-time;
    measuring a first switch time comprising the first on-time and a first discharge time of a first cycle;
    measuring a first tristate time of the first cycle;
    determining a first ratio of the first tristate time to the first switch time;
    comparing the first ratio to a first ratio threshold; and
    adjusting the on-time to a second on-time if the first ratio exceeds the first ratio threshold.

18. The method as recited in claim 17, wherein the first cycle is started in response to an error signal.

19. The method as recited in claim 18, wherein the error signal comprises a difference between the output voltage and a reference voltage.

20. The method as recited in claim 18, wherein:
the error signal comprises a difference between a propagation oscillation signal and a reference oscillation signal; and
the propagation oscillation signal represents a propagation delay of a digital circuit.

21. The method as recited in claim 18, wherein when the error signal crosses an error threshold, the switching circuitry is configured to charge the charging element for the on-time.

22. The method as recited in claim 17, wherein the charging element comprises an inductor.

23. The method as recited in claim 17, wherein after the on time, the switching circuitry is configured to discharge the charging element for the discharge time.

24. The method as recited in claim 23, wherein after the discharge time, the switching circuitry is configured to tristate the charging element for the tristate time.

25. The method as recited in claim 17, wherein if the first ratio is greater than the first ratio threshold, the second on-time is less than the first on-time.

26. The method as recited in claim 17, wherein if the first ratio is less than the first ratio threshold, the second on-time is greater than the first on-time.

27. The method as recited in claim 17, further comprising:
measuring a second switch time comprising the second on-time and a second discharge time of a second cycle;
measuring a second tristate time of the second cycle;
determining a second ratio of the second tristate time to the second switch time;
comparing the second ratio to a second ratio threshold; and
decreasing the on-time to a third on-time if the second ratio is greater than the second ratio threshold.

28. The method as recited in claim 27, wherein:
the second on-time is approximately 1/N times the first on-time; and
the third on-time is approximately 1/N times the second on-time.

29. The method as recited in claim 27, further comprising:
measuring a third switch time comprising the third on-time and a third discharge time of a third cycle;
measuring a third tristate time of the third cycle;
determining a third ratio of the third tristate time to the third switch time;
comparing the third ratio to a third ratio threshold; and
resetting the on-time to the first on-time if the third ratio is less than the third ratio threshold.

30. The method as recited in claim 17, wherein a digital timer is used to time the on-time.

31. The method as recited in claim 17, wherein a digital timer is used to time the discharge time.

32. The method as recited in claim 17, wherein a digital timer is used to time the tristate time.

* * * * *